Dec. 22, 1942.  N. A. PALMGREN  2,305,731
INDICATING GAUGE
Filed July 18, 1941  2 Sheets-Sheet 2

Patented Dec. 22, 1942

2,305,731

UNITED STATES PATENT OFFICE 2,305,731

INDICATING GAUGE

Nils Arvid Palmgren, Goteborg, Sweden

Application July 18, 1941, Serial No. 403,045
In Sweden July 18, 1940

9 Claims. (Cl. 116—129)

The present invention relates to an indicating gauge which combines facility in use with low cost of manufacture, insusceptibility to injury, and which is especially suitable for making measurements within tolerance limits of the magnitude of 0.1 mm.

An indicating gauge according to the invention is characterized substantially thereby that a wholly or partly flexible member, preferably in the shape of a U- or V-formed loop is attached at one end to the frame of the gauge or to a member fixed thereto, and is attached at the other end to a member co-operating with a gauging finger for contact with the work, the portion of the flexible member between the points of attachment being free and carrying a pointer fixed thereto.

Figure 1:
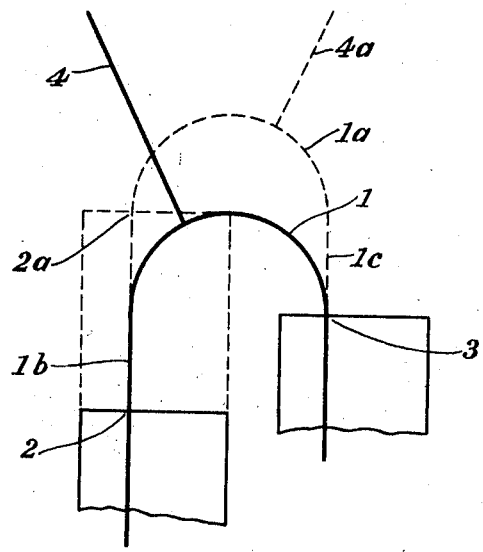
Figure 5:
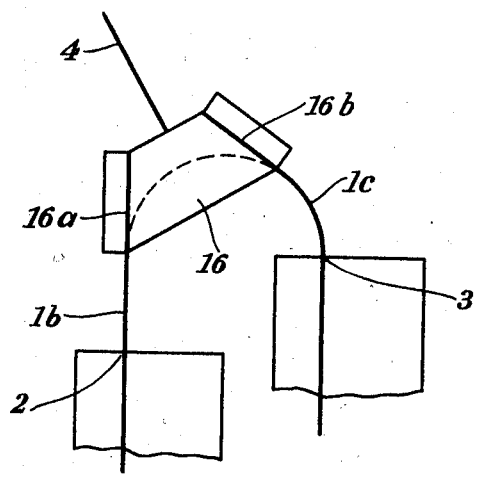
Figure 2:
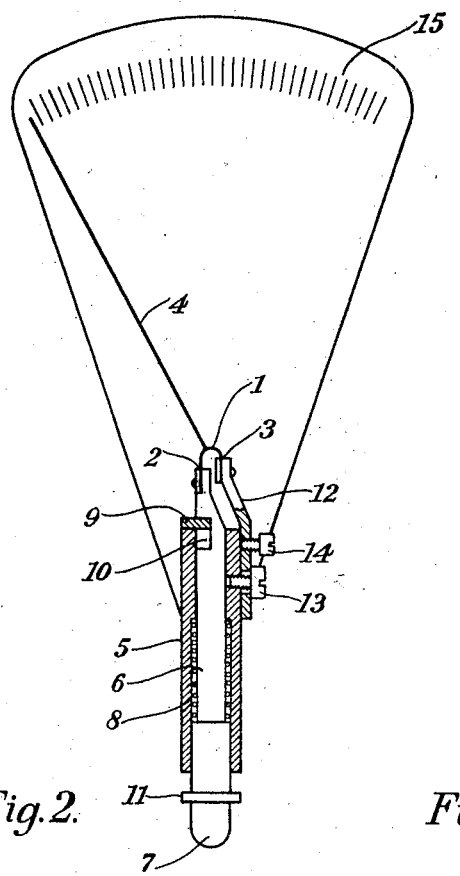
Figure 3:
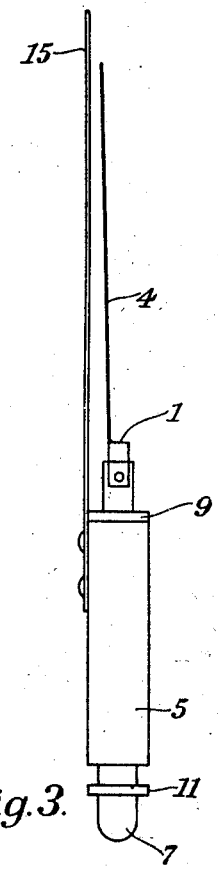
Figure 4:
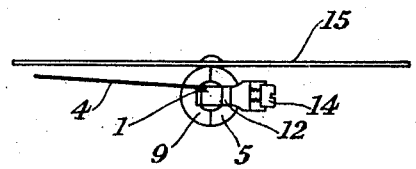

The invention is described in the following in connection with the accompanying drawings in which Fig. 1 shows a form of the flexible member with the pointer and the manner of attaching the ends of the flexible member. Figs. 2, 3, and 4 show a complete gauge according to an embodiment of the invention in three different projections, of which Fig. 2 is partially in section. Fig. 5 finally shows another form of the flexible member.

In Fig. 1 the numeral 1 indicates a thin prismatic band or ribbon with the same elastic qualities at all points and which is held in the form of a U-shaped loop and attached at 2 to a member co-operating with the gauging or contact finger and which can be moved in the direction of the band at the point of attachment. The other end of the band is fixed at 3 to a stationary member which is connected to the frame of the instrument. In the normal position, which is shown by the solid lines, the band from the point 3 forms first a semi-circle, which at the other end merges into a straight portion 1b tangent to the semi-circle and having a length equal to half the stroke of the member 2. At the center of the free part of the band, i. e., the part between the points of attachment 2 and 3 is attached a pointer 4. When the point 2 is moved to the position 2a, each point on the curved portion of the band is moved peripherally a distance equal to half the distance between points 2 and 2a. At the same time the band changes position and shape so that that part adjacent to point 2a will become curved in the form of a semi-circle, and a straight part 1c will be formed adjacent to point 3, as shown by the dotted lines in Fig. 1. The point upon the band, at which the index 4 is fixed changes its angular position, thus causing a deflection of the pointer. The magnitude of this deflection ($u$) at the end of the pointer relative to the length ($L$) of the pointer will be approximately as the distance ($f$) through which point 2 moves relative to the diameter ($d$) of the circular part of the band, i. e.

$$\frac{u}{L}=\frac{f}{d} \text{ or } \frac{u}{f}=\frac{L}{d}$$

The deflection will therefore be practically proportionate to the distance being measured independent of the size of the deflection as long as it remains within 180°.

The gauge illustrated in Figs. 2, 3, and 4 comprises a sleeve 5, in which a finger 6 is axially movable. The lower end 7 of the finger is formed as a contact point. The finger is held depressed by a spring 8 acting between the finger 6 and the sleeve 5. The downward movement of the finger is limited by a stop 9 located in a groove 10 in the finger. The upward movement of the finger is limited by a flange 11. An arm 12 is fixed to the sleeve 5 by means of a screw 13. The hole in the arm 12 for this screw is elongated so that the arm 12 can be adjusted in the axial direction of the sleeve 5. The arm 12 is further provided with a screw 14 by means of which its upper part can be adjusted to a greater or less distance from the finger 6. A flexible band 1 is fixed at one end to the upper end 2 of the finger 6 and at its other end to the upper end 3 of the arm 12, so that the band assumes the shape shown in Fig. 1.

A pointer 4 is fixed to the band, as shown in Fig. 1, and its reading can be seen on the scale 15.

The zero reading of the pointer can be adjusted by adjusting the length of the flexible member 1 at one or both of the points of attachment or by adjusting the arm 12 in the axial direction of the sleeve 5. The relationship between the length of the deflection ($u$) of the end of the pointer and the movement ($f$) of the contact point 7, or in other words the magnification can be adjusted by moving the point 3 on the arm 12 nearer to or farther from the point 2 on the finger 6 by means of the screw 14. This adjustment alters the diameter ($d$) of the circular part of the band 1 making $d$ less or greater which changes the magnification $$\frac{u}{f}$$

in the gauge making it greater or less respectively.

The central part of the loop 1 shown in Fig. 1 on both sides of the point of attachment of the pointer will remain practically unaltered for all readings of the instrument. This part can therefore be replaced by a rigid part. Fig. 5 shows how the loop can be made according to such an embodiment. The central part of the loop comprises a rigid block 16 to which two flexible members 1b and 1c are fixed, forming a certain angle with each other. The pointer 4 is fixed to the block 16, and the members 1b and 1c are fixed at 2 and 3 in the manner described in connection with Fig. 1. The dotted arc of a circle in Fig. 5 indicates the form which the loop would have if it comprised a band along its whole length from 2 to 3. The surfaces 16a and 16b on the block 16 are tangent to the circle at the end of the dotted arc. The length of the arc which is replaced by the block should at the most be equal to the length of the semi-circle minus half the length of the stroke of the point 2.

The invention is not limited to the forms described above, but can be embodied in a number of different manners. Thus the flexible loop can be made of wire or may comprise combinations of flexible and rigid parts in different manners. The free length of the loop between the end points can be greater than in the embodiments described. In this case the loop can assume a more or less double curved shape or a drop-like shape. The radius of curvature of the central part, and therewith the relative magnification, can then be altered simply by shortening or lengthening the free length of the loop. The pointer can be made in one piece with the loop or be made of other material than the same. The connecting member between the contact point and the loop can be made in different manners.

Having thus described my invention, I claim and desire to secure by Letters Patent:

1. An indicating gauge comprising a frame, a flexible member flexed through an arc of approximately 180° to form a loop, one leg of which is connected to the frame, a work contact finger connected to the other leg and guided for movement in the frame substantially parallel to a plane tangent to the leg of the loop that is secured to the frame, the flexible member being free in the intermediate portion between the legs, and indicating means rigidly attached to the said intermediate portion of the member.

2. An indicating gauge comprising a frame, a work contact finger movably supported in the frame, a resilient member having one end connected to the frame and the other end to said finger and being flexed between the said points of connection through an angle of approximately 180° to the form of a free self-supporting and open-sided loop, said finger being movable in a direction substantially parallel to the geometrical axis of the loop which interests the said open end and the curved portion of the loop, an indicating element rigidly attached to the curved portion of the loop, and means for adjusting the first-named end of the resilient member in the frame in a direction substantially parallel to the path of movement of the finger.

3. An indicating gauge comprising a frame, a flexible member flexed to form a substantially U-shaped loop, means for connecting one leg of the loop to the frame, a work contact finger guided in the frame for movement substantially parallel to a plane tangent to the leg of the loop that is secured to the frame, means for connecting said finger to the other leg of the loop, the flexible member being free in the intermediate portion between the legs, indicating means rigidly attached to the said intermediate portion of the member, and means for adjusting the distance between said connecting means independently of the said movement of the finger.

4. An indicating gauge comprising a frame, a thin flexible member forming a substantially U-shaped loop, means for connecting one leg of the loop to the frame, a work contact finger guided in the frame for movement parallel to a plane tangent to the leg of the loop that is secured to the frame, means for connecting said finger to the other end of the loop, means for adjusting the said connecting means at one end of the loop relative to the connecting means at the other end of the loop in a direction substantially parallel to the direction of movement of the contact finger and independently of said movement, the said flexible member being free in the curved intermediate portion of the loop between the legs, and indicating means rigidly attached to said intermediate portion of the member.

5. An indicating gauge according to claim 1, wherein the portions of the flexible member at each side of the loop are substantially tangent to the latter.

6. An indicating gauge comprising a frame, a flexible prismatic member having substantially the same elastic qualities at all points whereby the said member tends to assume an even circular curvature upon flexure, said member being held in the form of a substantially semicircular loop and having one leg connected to the frame, a work contact finger guided in the frame for movement substantially parallel to a plane tangent to the leg of the loop that is secured to the frame and connected to the other end of said flexible member, the flexible member being free in the intermediate portion between the legs, and indicating means rigidly attached to the said intermediate portion of the member.

7. An indicating gauge comprising a frame, a flexible member having a part thereof forming a substantially semicircular loop and having one leg connected to the frame, a work contact finger guided in the frame for movement substantially parallel to a plane tangent to the leg of the loop that is secured to the frame and connected to the other leg of the loop, the flexible member being free between the points of connection of the legs and having a free length equal to $\pi$ times the radius of the semicircle plus half the stroke at the point of connection of the said flexible member to the contact finger, and indicating means rigidly attached to the curved portion of the flexible member.

8. An indicating gauge comprising a frame, a work contact finger slidably supported in the frame, a pair of relatively spaced flexible members attached at one end to the frame and finger respectively, said members at the respective points of attachment extending substantially in a direction paralleling the path of movement of the finger, a rigid member attached to the other ends of and connecting the flexible members, said latter members at the points of connection with said rigid member extending at an angle to each other, and indicating means rigidly attached to said rigid member.

9. An indicating gauge comprising a frame, a work contact finger movably supported in the frame, a resilient member having one end connected to the frame and the other end to said finger and being flexed between the said points of connection through an angle of approximately 180° to the form of a free self-supporting and open-sided loop, said finger being movable in a direction substantially parallel to the geometrical axis of the loop which intersects the said open end and the curved portion of the loop, and an indicating element rigidly attached to the curved portion of the loop.

NILS ARVID PALMGREN.